Feb. 13, 1951 L. J. HEATON-ARMSTRONG 2,541,055
RADIO TELEGRAPH TRANSMITTER
Filed June 19, 1947
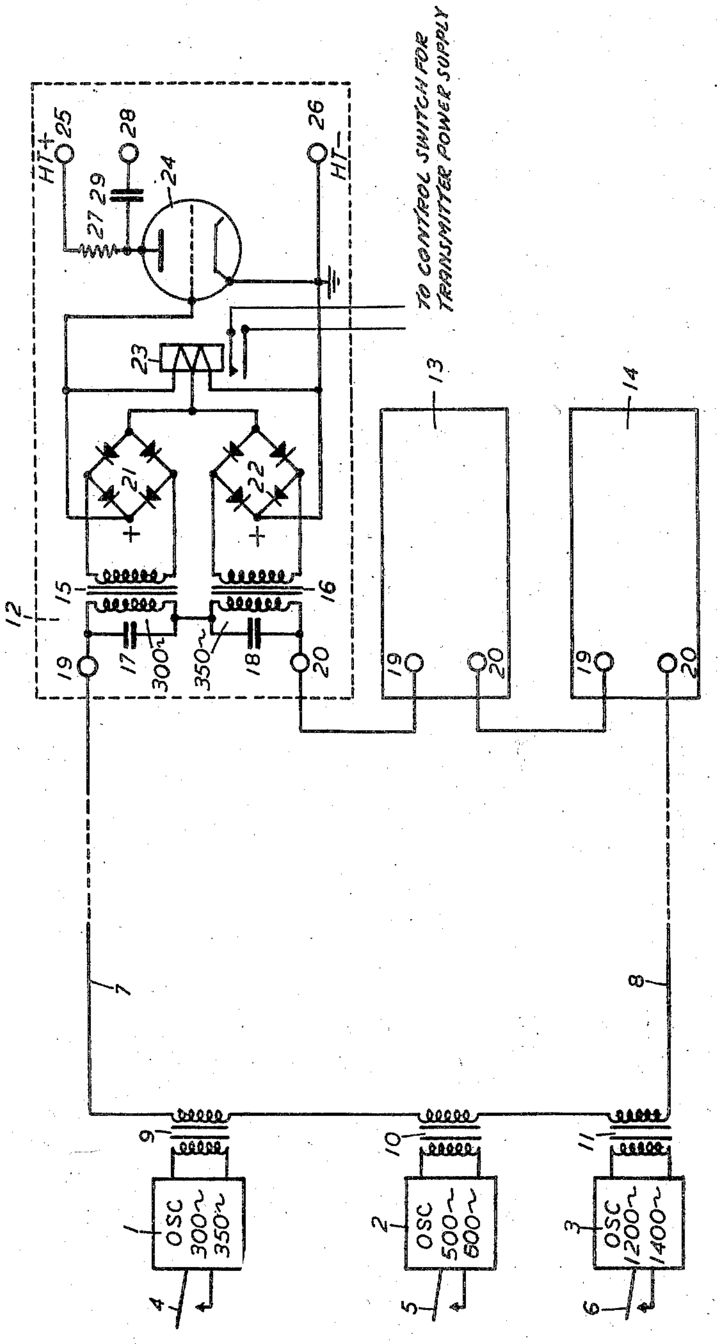
Inventor
Louis John Heaton-Armstrong
By [signature]
Attorney Patented Feb. 13, 1951 2,541,055

UNITED STATES PATENT OFFICE 2,541,055

RADIO TELEGRAPH TRANSMITTER

Louis John Heaton-Armstrong, London, England, assignor to International Standard Electric Corporation, New York, N. Y., a corporation of Delaware Application June 19, 1947, Serial No. 755,698
In Great Britain June 18, 1946

Section 1, Public Law 690, August 8, 1946
Patent expires June 18, 1966

5 Claims. (Cl. 178—51)

The present invention relates to the remote control of radio telegraph transmitters.

The principal object of the invention is to provide simple means for remotely and selectively switching on and keying one or more radio telegraph transmitters over a circuit common to all the transmitters.

The invention provides a remote-control system for a telegraph transmitter, comprising at the control location an oscillator, means for switching the oscillator output on or off, means for keying the frequency of the oscillator to give marking and spacing waves of different frequencies, means for transmitting the output wave of the said oscillator to the transmitter location, and at the transmitter location means responsive to the amplitude of the oscillator wave for switching on or off the operating power for the transmitter, and means responsive to the frequency of the oscillator wave for keying the transmitter.

The accompanying drawing gives a schematic circuit diagram of an embodiment of the invention. At the controlling station there are three oscillators 1, 2, 3 having respective controlling telegraph keys 4, 5 and 6 arranged so that when any key is open, the corresponding oscillator delivers a certain frequency characterising a mark signal, and when the key is closed it delivers a different frequency characterising a space signal. The oscillators are all connected to a two-conductor line 7, 8 by respective transformers 9, 10 and 11, the secondary windings of which may be connected in series as shown, or in parallel. Each oscillator generates a different pair of frequencies, which for illustration are taken as 300 and 350 cycles for oscillator 1, 500 and 600 cycles for oscillator 2 and 1200 and 1400 cycles for oscillator 3, the lower frequency in each case characterising the mark signal.

At the controlled station are three similar transmitter control circuits 12, 13 and 14, the details of No. 12 only being given. The circuit 12 comprises two transformers 15 and 16 having primary windings tuned by condensers 17 and 18 and connected in series between terminals 19 and 20. The secondary windings of these transformers are connected to the input diagonal terminals of individual bridge rectifiers 21 and 22 in the manner shown, the arrangement being such that the left-hand output diagonal terminal is positive to the right-hand terminal in both cases, when alternating current is supplied through the corresponding transformers.

A neutral relay 23 has two similar windings connected in opposition, each to the output terminals of one of the bridge rectifiers, in such manner that if equal alternating voltages are applied to both bridge rectifiers, the relay would be substantially unaffected. The contacts of the relay 23 are connected by any suitable means (not shown) to control apparatus for switching on the power for the radio transmitter served by the control circuit 12.

The positive output terminals of the two bridge rectifiers 21 and 22 are also connected respectively to the control grid and cathode of a valve 24 whose anode circuit is supplied with current from a high tension source (not shown) which should be connected to terminals 25 and 26, a load resistance 27 being connected in series with the anode.

The output from the anode of the valve is obtained from terminal 28 connected to the anode through a blocking condenser 29. The voltage obtained at terminal 28 will be applied to key the corresponding radio transmitter by application to a grid of the oscillating valve (not shown) or in any other convenient way.

The other control circuits 13 and 14 are exactly similar to 12 except as regards the frequency to which the transformers 15 and 16 are tuned. This will be explained later. The three control circuits are connected in series to the line conductors 7 and 8, as indicated.

Assuming that the control circuit 12 corresponds to the oscillator 1, the transformers 15 and 16 will be tuned respectively to the mark and space frequencies 300 and 350 cycles. Initially, the oscillator 1 will be supposed to supply no current to the line through the transformer 9. No current being received by either of the transformers 15 or 16 in the control circuit 12, the relay 23 will not be operated, and the corresponding radio transmitter will be switched off. When it is desired to switch on the radio transmitter, the oscillator 1 is connected to supply alternating current to the line 7, 8 through the transformer 9, by any suitable switching means (not shown). Such switching means may, for example, switch on the power for operating the oscillator, or alternatively it may simply connect the transformer 9 to the output circuit of the oscillator. If the telegraph key 4 is in the open position shown, the marking frequency current of 300 cycles will be applied to the line, and will set up oscillating currents of this frequency in the primary circuit of the tuned transformer 15, but will be relatively unaffected by the other transformer 16, so that the relay 23 will receive a much larger current in the upper winding than in the lower and will therefore be operated, thus switching on the radio transmitter. At the same time the control grid of the valve 24 will derive a relatively high positive potential from the rectifier bridge 21 and a low negative potential from the rectifier bridge 22, so that it will be positive with respect to the cathode. A large anode current flows in the valve 24, so that a low marking voltage will be obtained at terminal 28.

If now the key 4 is closed to send a spacing signal, the oscillator frequency is changed to 350 cycles, and the line current will now energize the transformer 16 and pass ineffectively through the primary circuit of transformer 15. The relay 23 remains operated, the current in the lower winding now preponderating over that in the upper winding, but the control grid of the valve 24 will now be negative to the cathode, since the negative with respect to voltage generated by the rectifier 22 will be greater than the positive voltage generated by the rectifier 21. The anode current of the valve 24 will therefore be reduced or completely cut off, and the voltage at terminal 28 therefore rises to a high spacing value.

The relay 23 should preferably be of the slow-to-release type so that it will not be liable to be released at the moment when the frequency of the oscillator 1 is changed. It will be evident that if the oscillator 1 be switched off or disconnected the relay 23 will be released, and the corresponding transmitter will be switched off.

The control circuits 13 and 14 will have their transformers 15 and 16 respectively tuned to the marking and spacing frequencies supplied by the corresponding oscillators 2 and 3. These frequencies will be 500 cycles and 600 cycles for circuit 13 and 1200 cycles and 1400 cycles for circuit 14. They will both evidently operate in the same way as circuit 12.

It should be noted, however, that should, for example, oscillator 2 be switched on instead of oscillator 1, the current at 500 or 600 cycles received by the circuit 12 will have very little effect upon both the transformers 15 and 16 associated with the control circuit 12, so that the opposed windings of the relay 23 will receive very small and nearly equal currents, the net effect of which will be insufficient to affect the relay of the latter if suitably chosen and adjusted. Thus the circuit 12 will not be effected by the switching on of either of the other circuits 13 and 14, and vice versa. It is to be noted also, that if one of the other circuits is switched on simultaneously with circuit 12, the cross-fire voltages applied to the control grid of the valve 24 and resulting from the small residual currents which will be respectively passed by the transformers 15 and 16 will be small, nearly equal, and opposite, so that the resulting cross-fire will be a second order effect.

By using frequency-shift keying at the control station, the selective circuits represented by the tuned transformers 15 and 16 can be very simple. Thus suppose the value of Q (ratio of reactance to resistance) of the tuned circuits is only 12, and that when the marking frequency of 300 cycles is transmitted, +30 volts is obtained from transformer 15, then about −10 volts will be obtained from transformer 16. The net voltage applied to operate the relay and valve will than be +20 volts. When the spacing frequency is sent, this net voltage will be reversed. It will usually be preferable to arrange so that the valve is taken beyond saturation by the application of the positive marking voltage, and beyond cut off by the negative spacing voltage.

If instead the adjacent circuit 13 is operated, and a marking current of 500 cycles is transmitted, the voltage produced by transformer 15 will be about 2.5 volts and that produced by transformer 16 will be about 3.7 volts and the difference, namely 1.2 volts will be small enough in comparison with the normal operating voltage of 20 volts for the cross-fire to be negligible. The relay 23 can also very easily be designed to operate on a net voltage of 20 but not on a net voltage of 1.2.

The particular numerical figures which have been given for illustration are not essential to the invention, and may be varied in any desired way. Any desired number of transmitters may be controlled in this manner over a single circuit, the only proviso being that different marking and spacing frequencies be selected for each transmitter. Generally speaking, the closer these frequencies are chosen in relation to the difference of the mean frequencies corresponding to adjacent transimtter, the smaller will be the interference between them.

It may be noted that the arrangement of the transformers 15 and 16, the rectifiers 21 and 22 and the relay 23 is substantially the same as that shown in Fig. 2 of British patent specification No. 442,342, and it operates on similar principles.

It will be noted that the operation of the neutral relay 23 is determined by the presence or absence of the current coming from the oscillator 1, that is upon its amplitude, and not by its frequency, while the operation of the valve 24 for keying the transmitter depends on the frequency of the current.

What is claimed is:

1. A remote-control system for a telegraph transmitter, comprising oscillator means for producing a first and a second frequency, a transmission line, control means for applying said frequencies alternately to said transmission line, a first and a second selective circuit serially connected across said line, said circuits being electrically tuned to resonate at said first and second frequency, respectively, load impedance means in each of said circuits connected to develop a maximum output at the resonant frequency of the respective circuit, a non-polar responsive device, circuit means connecting said load impedance means differentially to said device so that the latter will be actuated when one of said outputs materially exceeds the other and will remain inactive when the two outputs are substantially equal, a polar responsive device, circuit means connecting said load impedance means differentially across said polar responsive device so as to produce a first and a second mode of operation of the latter device if a respective one of said outputs materially exceeds the other, and output means for controlling the operation of a telegraph transmitter by the operation of both of said responsive devices.

2. The system according to claim 1 wherein said non-polar device comprises a relay having two windings, said windings being connected across respective ones of said load impedance means, and wherein said polar device comprises an electronic discharge tube having an input circuit connected across both of said load impedance means in series.

3. The system according to claim 1 wherein each of said load impedance means in each of said selected circuits comprises respectively a condenser and a transformer having a primary winding and a secondary winding, said primary winding connected to said condenser to form an electrically resonant circuit, said resonant circuits adapted to resonate respectively at said first and second frequencies.

4. The system according to claim 1 wherein each of said load impedances further comprise a unidirectional device connected between said secondary winding and said non-polar responsive device.

5. The system according to claim 1, wherein said output means comprises a pair of output terminals, a source of anode potential, an electronic discharge tube having an anode and a cathode, said tube serially connected across said source, a second load impedance serially connected between said anode and said source, and a capacitance serially disposed between said anode and one of said output terminals.

LOUIS JOHN HEATON-ARMSTRONG.

REFERENCES CITED

The following references are of record in the file of this patent:

UNITED STATES PATENTS

| Number | Name | Date |
|---|---|---|
| 1,635,779 | Cartier | July 12, 1927 |
| 1,678,973 | Brown | July 31, 1928 |
| 1,897,739 | Stablein | Feb. 14, 1933 |
| 2,150,241 | Nichols | Mar. 14, 1939 |
| 2,198,901 | Boswau | Apr. 30, 1940 |